INVENTOR
AUGUST A. LIEBE

June 22, 1965  A. A. LIEBE  3,190,681
COMBINATION OF TWO MEMBERS SHRUNK ON EACH WITH
THE INTERPOSITION OF A SLEEVE
Filed July 16, 1962  2 Sheets-Sheet 2

INVENTOR
AUGUST A. LIEBE
BY
AGENT

United States Patent Office 3,190,681
Patented June 22, 1965

3,190,681
COMBINATION OF TWO MEMBERS SHRUNK ON EACH WITH THE INTERPOSITION OF A SLEEVE
August Albert Liebe, Emmasingel, Eindhoven, Netherlands, assignor to North American Philips Company, Inc., New York, N.Y., a corporation of Delaware
Filed July 16, 1962, Ser. No. 209,981
Claims priority, application Netherlands, July 24, 1961, 267,473
4 Claims. (Cl. 287—52)

The invention relates to a combination of two members and an interposed sleeve. In this combination, the first member, which at its inner circumference is provided with a fitting surface, is shrunk on the second member with the interposition of the sleeve having fitting surfaces on its inside and outside, which second member is provided with a fitting surface on its outer circumference. In the proximity of a pair of fitting surfaces facing each other and occurring on one of the members and the sleeve, a chamber is present which is entirely embraced by that member and the sleeve. This chamber is connected to the space outside the combination via a pipe. In this manner, a medium under pressure may be supplied to this chamber, as a result of which the members which form the boundaries of the chamber are pressed away from each other and the fitting surfaces of these members separate. Such a combination may be used to mount a machine element forming part of the first member, for example a toothed wheel or a belt pulley, to a pivot and to demount it from it.

In a known embodiment of such a combination, a pair of fitting surfaces facing each other are conical, while between this pair of fitting surfaces the chamber is located to which oil under pressure may be supplied.

A drawback of this known embodiment is that the manufacture of the conical fitting surfaces should be carried out particularly accurately, which is very difficult technically in the manufacture and is comparatively costly. An additional drawback is that when demounting this combination the members separate with a shock.

The object of the combination according to the invention is to mitigate these drawbacks and it is characterized in that preferably all the fitting surfaces of the combination are cylindrical and, in the mounting condition of the combination, only one of the members and the sleeve have a difference in shrinkage measure with respect to each other. In the mounted condition, there is provided a chamber between one of the members and the sleeves, which chamber divides the fitting surfaces present between the relative member and the sleeve into two parts, the ends of the fitting surfaces of that member located in the front in the relative direction of mounting of the member in question being located at equal distances from the ends of the fitting surfaces facing that body and occurring on that sleeve in the opposite direction. In this case, the axial direction of the fitting surface located in the front in the relative mounting direction of that member is smaller than the axial dimension of the part of the chamber in the sleeve, while the fitting surface occurring on the sleeve and located in the front in the opposite direction has a smaller axial dimension than the part of the chamber in the member in question. The fitting surfaces on either side of the chamber occurring on the member in question, as well as those occurring on the sleeve all have the same diameter in the mounted condition.

Because all the fitting surfaces of the combination are cylindrical, the manufacture of these fitting surfaces with the desired accuracy is simple. An additional advantage during the manufacture is that the fitting surfaces occurring at the same circumference of one of the members and the sleeve all have the same diameter, as a result of which they can be manufactured in one operation with the same tolerances. Because, in addition, the fitting surfaces occurring on either side of the chamber have the same diameter, no axial force will be exerted on these bodies during demounting by the medium under pressure supplied to the chamber, as a result of which the shockwise disengagement of the members is avoided. A further advantage of the fact that the oil exerts no axial force on the members is that by supplying oil to the chamber the fitting surfaces of the members between which the chamber occurs separates so that then the shaft and the toothed wheel or belt pulley shrunk onto it may be turned with respect to each other, if desired.

A favorable embodiment of the combination according to the invention is characterized in that the coefficient of expansion of the material from which the sleeve is manufactured is unequal to the coefficient of expansion of the material of the member which in the demounted condition of the combination shows the difference in shrinkage measure with respect to the sleeve, the chamber being located between the member in question and the sleeve.

A favorable embodiment of the combination according to the invention is further characterized in that the coefficients of expansion of the material from which the sleeve is manufactured and that of the material of the member which shows the difference in shrinkage measure with respect to the sleeve in the demounted condition of the combination, are at least substantially equal to one another, in which an oil pipe empties at the fitting surfaces located between the sleeve and the member in question, in which the chamber is located between the sleeve and the other member.

A further favorable embodiment of the combination according to the invention is characterized in that the chamber of the combination divides the fitting surfaces facing each other between the member in question and the sleeve into two parts with equal axial dimensions, the axial dimension of these members being smaller than the axial dimension of the chamber.

In order that the invention may readily be carried into effect, certain embodiments thereof will now be described more fully, by way of example, with reference to the diagrammatic drawings not drawn to scale.

FIGS. 1, 2 and 3 show an embodiment of the combination according to the invention in an axial cross-section and in a mounted and demounted condition respectively. In this embodiment, the chamber is located between the sleeve and the outer member, the sleeve and that member having the difference in shrinkage measurements with respect to each other in the demounted condition and different coefficients of expansion.

Figure 1:
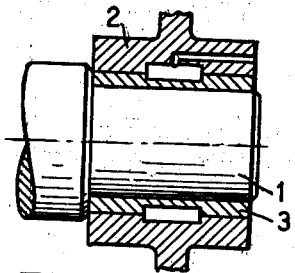
Figure 2:
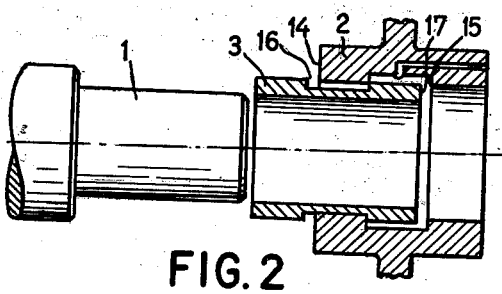
Figure 3:
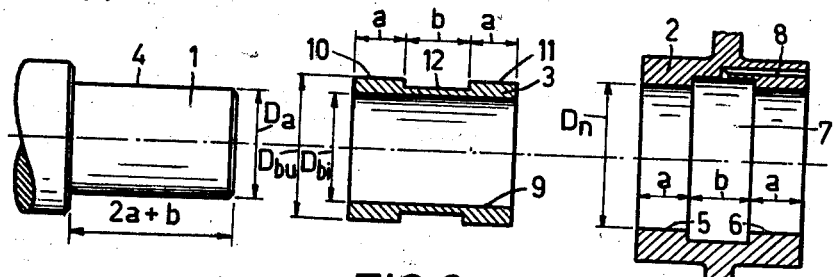

In FIGS. 1, 2 and 3, a member 2 is shrunk upon a pivot 1 with the interposition of a sleeve 3. This member 2 may be, for example, the hub of a toothed wheel, belt pulley or flywheel. The pivot 1 is cylindrical and has a fitting surface 4 of a diameter $D_a$ at its outer circumference. The inner circumference of the member 2 has the fitting surfaces 5 and 6 which are also cylindrical and have the same diameter $D_n$. The fitting surfaces 5 and 6 also have an equal axial dimension $a$. Between the fitting surfaces 5 and 6 is located a cylindrical groove 7 which has a larger diameter than the fitting surfaces 5 and 6. This groove 7 has an axial dimension $b$ which exceeds the axial dimension $a$ of the fitting surfaces 5 and 6. In addition, an oil supply pipe 8 is present in the member 2 which empties in the groove 7. The inner circumference of the sleeve 3 is provided with the cylindrical fitting surface 9 which has a diameter $D_{bi}$. This diameter $D_{bi}$ corresponds to the diameter $D_a$ of the pivot 1. The outer circumference of the sleeve 3 is provided with the fitting surfaces 10 and 11 and an annular groove 12. The diameter $D_{bu}$ of the fitting surfaces 10 and 11 exceeds the diameter of the groove 12. The diameter $D_{bu}$ of the fitting surfaces 10 and 11 and the diameter $D_n$ of the fitting surfaces 5 and 6 of the member 2 have the difference in shrinkage measurement with respect to each other. It is clear that the oil pipe 8 which in this combination is located in the member 2, may also be provided in the sleeve 3. It is also possible to supply oil to the chamber by providing a channel in the pivot 1 which empties in the chamber through a bore in the sleeve 3.

The mounting of the combination is carried out as follows: Since the diameter $D_a$ of the pivot 1 and $D_{bi}$ of the sleeve 3 are equal to one another, the sleeve 3 may be slid on the pivot 1. By heating the member 2, it will expand so that the diameter $D_n$ of the fitting surfaces 5 and 6 becomes larger and the difference in shrinkage measurement which originally existed between the diameter $D_n$ of the fitting surfaces 5 and 6 and the diameter $D_{bu}$ of the fitting surfaces 10 and 11 is removed. As a result of this, the member 2 may be slid onto the sleeve 3. After cooling the fitting surfaces 5 and 6 of the member 2 will be shrunk on the fitting surfaces 10 and 11 respectively of the sleeve 3. As a result of the shrinkage stresses occurring in the fitting surfaces 10 and 11, the sleeve 3 will somewhat be upset as a result of which the diameter $D_{bi}$ would become somewhat smaller if the sleeves were not mounted on the pivot 1. However, because after mounting the pivot 1 is located in the sleeve 3, shrinkage stresses will also be produced between the fitting surfaces 9 and 4 owing to the upsetting, as a result of which the sleeve is tightly shrunk on the pivot 1.

For demounting, oil under pressure is supplied through the pipe 8 to the chamber 13 formed by the annular recesses 7 and 12. By the oil pressure, the member 2 will expand somewhat, as a result of which the fitting surfaces 5–10 and 6–11 facing each other will separate. Consequently it becomes possible to shift the member 2 with respect to the sleeve 3 and the pivot 1 in an axial direction through such a distance until the ends 14 and 15 of the fitting surfaces 6 and 5 located in the front in the relative direction of mounting of the member 2 have passed the ends 16 and 17 of the fitting surfaces 11 and 10 of the sleeve located in the front in the opposite direction. At this instant, the oil pressure in the chamber 13 ceases and the fitting surfaces 5 and 6 again obtain their original diameter $D_n$ which, as already stated, is somewhat smaller than the diameter $D_{bu}$ of the fitting surfaces 10 and 11 (namely the difference $k$ in shrinkage measurement). In this state the fitting surface 6 of the member 2 is located in the groove-shaped recess 12 of the sleeve 3, while on the other side the fitting surface 10 of the sleeve 3 is located in the groove-shaped recess 7 of the member 2. In this state, no forces are exerted on the sleeve 3 so that the shrinkage stresses prevailing between the fitting surface 4 of the pivot 1 and 9 of the sleeve 3 in the mounted condition have disappeared. As a result of this, it is possible to remove the sleeve 3 with the member 2 from the pivot 1 (see FIG. 2). In order to remove the sleeve 3 further from the member 2 or to slide it into the member again, a thermal treatment should be used. Because the member 2 and the sleeve 3 are manufactured from materials having unequal coefficients of expansion, the member 2, on heating, will expand to a greater extent than the sleeve 3 if the member 2 is manufactured from a material which has a larger coefficient of expansion than the material of the sleeve 3. As soon as the expansion of the member 2 has made such progress that the diameter $D_n$ of the fitting surface 6 is equal to or somewhat larger than the diameter $D_{bu}$ of the fitting surface 10 the sleeve 3 may be removed from the member 2 or slid further into the member 2.

If the coefficient of expansion of the material from which the member 2 is manufactured is smaller than that of the material of the sleeve 3, the assembly of sleeve and member should be cooled instead of heated.

Figure 4:
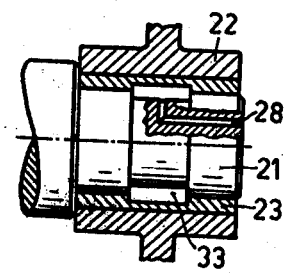
FIGS. 4, 5 and 6 show an embodiment of the combination according to the invention, also in the mounted and demounted conditions respectively. In this case, the chamber is located between the shaft and the sleeve, in which the shaft and the sleeve have the difference in shrinkage measurement, with respect to each other in the demounted condition and have different coefficients of expansion.
Figure 5:
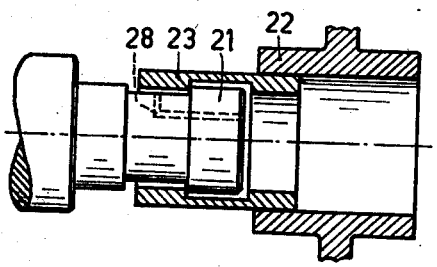
Figure 6:
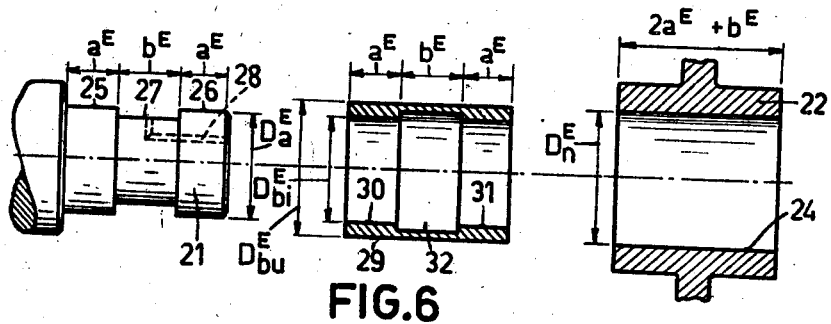

In FIGS. 4, 5 and 6, an embodiment of the combination according to the invention is shown in which the chamber 33 is located between a pivot 21 and a sleeve 23. In this case the pivot 21 has fitting surfaces 25 and 26 of equal dimension $a$ and equal diameter $D_a$ while between these fitting surfaces there is located a groove 27 having a smaller diameter and an axial dimension $b$ which exceeds the axial dimension $a$ of the fitting surfaces 25 and 26. In the pivot 21 an oil supply pipe 28 is provided which empties in the groove 27. The inner side of the sleeve 23 has the fitting surfaces 30 and 31 of equal axial dimension $a$ and equal diameter $D_{bi}$ while an annular groove 32 is located between the fitting surfaces 30 and 31 having an equal axial dimension $b$ and a larger diameter than these fitting surfaces. The outside of the sleeves 23 is provided with a cylindrical fitting surface 29 which has a diameter $D_{bu}$. The inside of the member 22 is provided with the cylindrical fitting surface 24 which has a diameter $D_n$ which is equal to the diameter $D_{bu}$ of the sleeve 23. The diameter $D_{bi}$ of the fitting surfaces 30 and 31 and $D_a$ of the fitting surfaces 25 and 26 in this case have the difference $k$ in shrinkage measurement. The mounting and demounting of this combination is carried out in a corresponding manner as indicated above in the embodiment shown in FIGS. 1, 2 and 3. The only difference is that the member 22 may be removed entirely from the sleeve without using a thermal treatment, while afterwards the sleeve 23 may be removed from the pivot 21 by a thermal treatment or if desired, may be slid on the pivot again.

Figure 7:
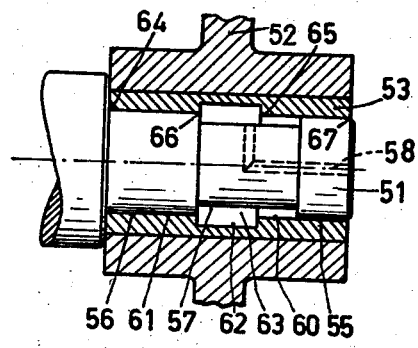
FIG. 7 shows an alternate embodiment of the combination according to the invention in an axial section.

FIG. 7 shows a somewhat different embodiment of the combination according to the invention, in which a member 52 is shrunk on a shaft 51 with the interposition of a sleeve 53. In this case the shaft 51 is provided with the fitting surfaces 55 and 56 of unequal axial dimension and of equal diameters. The inner circumference of the sleeve 53 is provided with the fitting surfaces 60 and 61 having equal diameters, the diameter of these fitting surfaces has a difference $k$ in shrinkage measurement with respect to the diameter of the fitting surfaces 55 and 56. In the shaft 51 between the fitting surfaces 55 and 56 there is located an annular groove 57 in which an oil supply pipe 58 empties which is located in the shaft. In the sleeve 53 between the fitting surfaces 60 and 61 there is located an annular groove 62 which has a diameter larger than that of these fitting surfaces. The axial dimension of the fitting surfaces located on either side of the chamber 63 constituted by the groove-shaped recesses 57 and 62 is such that the axial dimension of the fitting surfaces 55 located in the front in the relative direction of mounting of the shaft 51 is smaller than the axial dimension of the groove-shaped recess in the sleeve 53, while the fitting surface 61 occurring on this sleeve in the opposite direction has a smaller axial dimension than the groove 57 in the shaft 51. In addition, in the mounted condition, the ends 66 and 67 of the fitting surfaces 56 and 55 of the shaft located in the front in the relative direction of mounting of the shaft 51 are equally far remote from the ends 64 and 65 located in the opposite direction of the fitting surfaces 61 and 60 of the sleeve. When demounting, again oil is supplied to the chamber 63 via the pipe 58 as a result of which the sleeve 53 and consequently also the member 52 are somewhat expanded. As a result of this, the shaft 51 and the sleeve 53 are released so that the sleeve and this member can be shifted with small force with respect to the shaft 51 until the ends 64–66 and 65–67 of the fitting surfaces facing each other have passed one another. Then the oil pressure ceases and the fitting surface 61 penetrates into the groove 57, while the other fitting surface 55 somewhat engages the opposite groove 62. Then the sleeve 53 and also the member 52 have the same dimension as before mounting, so that the member 52 can be removed from the sleeve 53. Then the sleeve 53 may be removed from the shaft by a thermal treatment or again shrunk on the shaft, if desired. This method may also be carried out by firmly pressing together the ends of the fitting surfaces 56–61 and 55–60 in the relative direction of mounting and then supplying oil under pressure to the chamber 63 as a result of which the sleeve 53 is somewhat expanded and can be slid on the shaft.

Figure 8:
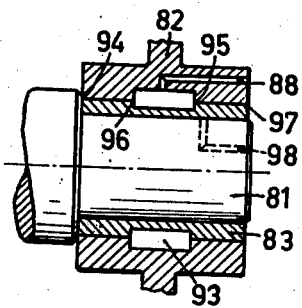
FIGS. 8 and 9 show an embodiment of the combination according to the invention in the mounted and demounted conditions respectively. In this case, the chamber is located between the sleeve and the hub, while the sleeve and the shaft show the difference in shrinkage measurement with respect to each other in the demounted condition and have equal coefficients of expansion.
Figure 9:
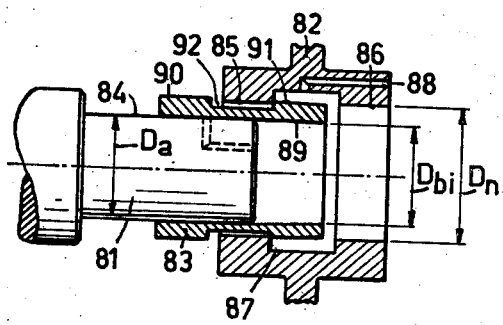

In FIGS. 8 and 9 an embodiment of the combination according to the invention is shown in which the coefficient of expansion of the shaft which has the difference $k$ in shrinkage measure with respect to the sleeve is equal to the coefficient of expansion of the material of the sleeve. In this figure, a pivot is indicated by 81 and a circumferential sleeve by 83. The hub fitting this assembly is indicated by 82. The pivot 81 is provided with a fitting surface 84 having a diameter $D_a$. The inside of the sleeve 83 is provided with the fitting surface 89 which has a diameter $D_{b1}$ which is smaller than the diameter $D_a$ of the fitting surface 84 of the shaft 81 exactly by the difference $k$ in shrinkage measurement. The sleeve 83 has on its outer circumference fitting surfaces 90 and 91 which have an equal diameter $D_{bu}$. This diameter $D_{bu}$ corresponds to the diameter $D_n$ of the fitting surfaces 85 and 86 of the inner circumference of the hub. The sleeve 83 is further provided with a groove 92 located between the fitting surface 90 and 91, while the hub 82 has a corresponding groove 87 located between the fitting surfaces 85 and 86 of the hub. These two grooves 87 and 92 in the mounted condition of the combination together constitute a chamber 93 which is connected through a channel 88 to the space outside the combination and through which channel oil under pressure may be supplied to the chamber 93. The ends 94 and 95 of the fitting surfaces 86 and 85 of the hub 82 are located at an equal distance from the ends 96 and 97 of the fitting surfaces 91 and 90 of the sleeve 83. In addition, a channel 98 is provided in the pivot 81 through which channel oil under pressure may be supplied between the fitting surfaces 84 and 89 of the pivot and the sleeve.

Mounting of the combination may be carried out as follows: Since the diameter $D_{bu}$ of the fitting surfaces 90 and 91 of the sleeve 83 corresponds to the diameter $D_n$ of the surfaces 85 and 86 of the hub 82 the sleeve may be slid into the hub as such. After heating the assembly of sleeve 83 and hub 82 or cooling the pivot, this assembly may be slid onto the pivot 81. After cooling, the sleeve and the hub are shrunk on the pivot 81.

Demounting is carried out by supplying oil under pressure to the chamber 93 through the pipe 88, as a result of which the hub 82 is expanded and the fitting surfaces 86, 91 and 85, 90 are separated. The hub 82 may not be removed from the sleeve until the fitting surface 86 falls into the groove 92. Then oil under pressure is supplied through the pipe 98 between the fitting surfaces 89 and 84 of the sleeve 83 and the pivot 81, as a result of which these fitting surfaces are somewhat separated and the sleeve may be removed from the hub. If the sleeve 83 has reached the state shown in FIG. 9, the right hand part of this sleeve again assumes its old dimensions, that is to say the diameter of the fitting surface 90 again obtains the value $D_{bu}$ so that the hub 82 can be removed from the combination. The sleeve 83 may then be slid on the shaft 81 or, if desired, be removed further from the shaft by supplying oil between the fitting surfaces 84 and 89. This removal of the sleeve 83 from the pivot 81 should not be effected until the final face of the sleeve has reached the orifice of the channel 98. Then the oil pressure ceases between the fitting surfaces 84 and 89 and the sleeve 83 is again shrunk on the shaft 81 with the old shrinkage stress. Because the coefficients of expansion of the shaft 81 and the sleeve 83 are equal, heating this assembly will not remove the shrinkage stresses prevailing between the sleeve and the shaft, so that for further demounting of the sleeve 83 from the shaft mechanical means will have to be used. In practice, removing this sleeve 83 from the pivot 81 entirely will not be necessary in most of the cases, so that then the sleeve can be slid again on the hub.

Figure 10:
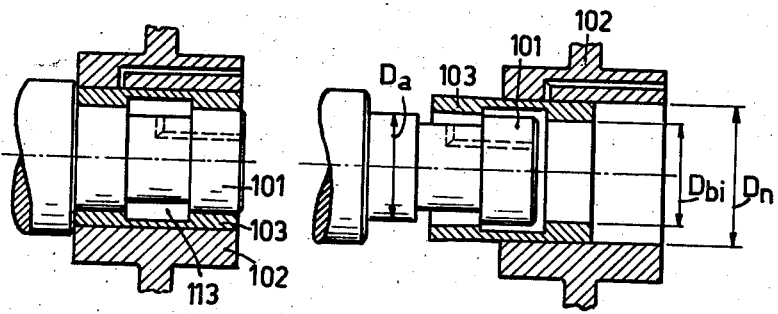
FIGS. 10 and 11 show an embodiment of the combination according to the invention in the mounted and demounted conditions respectively, the chamber occurring between the sleeve and the shaft, the sleeve and the hub showing the difference in shrinkage measurement with respect to each other in the demounted condition and having equal coefficients of expansion.
Figure 11:
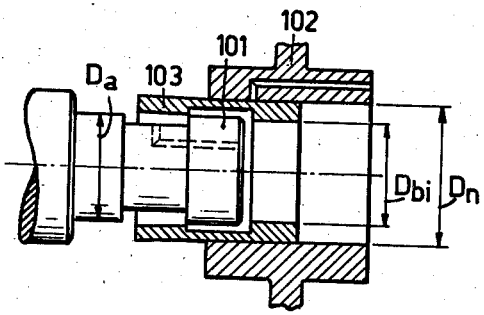

In FIGS. 10 and 11 another embodiment of the combination according to the invention is shown in which the sleeve and the hub which has the difference in shrinkage measurement with respect to that sleeve have the same coefficients of expansion. This combination also consists of a pivot 101, a hub 102 and an interposed sleeve 103. In this combination, the fitting surfaces of hub and sleeve show the difference $k$ in shrinkage measurement with respect to each other. The chamber 113 in this case is located between the pivot 101 and the sleeve 103. Mounting and demounting may be carried out entirely in accordance with the method described in the combination of FIGS. 8 and 9.

What is claimed is:

1. A joint comprising two telescoping, spaced first and second members and a sleeve interposed therebetween, said first and second members having surfaces interfitting with the interior and exterior surfaces of said sleeve respectively, an enclosed chamber defined by an annular groove in adjacent surfaces of one of said members and said sleeve, the axial surfaces defining said annular groove being axially co-extensive and the side walls defining said annular groove being radially aligned, a conduit means connecting said enclosed chamber to the atmosphere, said one of said members and the sleeve being secured together by a shrink fit, said chamber dividing the surfaces engaged by said shrink fit into two parts, the axial extent of each of said first parts being equal and less than the axial extent of said axial chamber surfaces, the clearance between the other of said members and said sleeve being such that the reduction in radial dimensions of said sleeve by said shrink fit causes said other member to be bound to said sleeve, said conduit means being connectable to a fluid pressure source whereby the above parts which have been shrunk together may be expanded and one of said parts moved to an axially displaced position wherein one of said engaging surfaces may drop into the annular groove in the opposed surface of the adjacent member thereby permitting the three members to be radially disconnected.

2. A joint as claimed in claim 1 wherein the coefficient of expansion of the sleeve material is unequal to the coefficient of expansion of one of said members.

3. A joint as claimed in claim 1 wherein said conduit means is located at the fitting surfaces between said sleeve and the corresponding member, said conduit means being provided with a liquid medium which empties into said chamber.

4. A joint as claimed in claim 1 wherein said chamber divides the interfitting surfaces between one of said members and said sleeve into two parts of equal axial dimensions, said axial dimensions of each of said parts being smaller than the axial dimensions of said chamber.

References Cited by the Examiner
UNITED STATES PATENTS

| | | | |
|---|---|---|---|
| 2,764,437 | 9/56 | Bratt | 29—427 |
| 2,840,399 | 6/58 | Harless et al. | 29—427 |
| 2,899,806 | 8/59 | Fye | 29—427 |

FOREIGN PATENTS 599,251   3/48   Great Britain.

CARL W. TOMLIN, *Primary Examiner.*